United States Patent Office 3,663,474
Patented May 16, 1972

3,663,474
ERBIUM OXIDE/YTTERBIUM OXIDE DOPED GLASS LASERS
Haynes A. Lee, Jr., Sylvania, and Charles F. Rapp, Toledo, Ohio, assignors to Owens-Illinois, Inc.
No Drawing. Continuation-in-part of application Ser. No. 765,039, Oct. 4, 1968. This application Apr. 14, 1970, Ser. No. 28,518
The portion of the term of the patent subsequent to July 22, 1986, has been disclaimed
Int. Cl. C09k 1/54; C03c 3/28, 3/04
U.S. Cl. 252—301.4 F        26 Claims

ABSTRACT OF THE DISCLOSURE

Erbium oxide/ytterbium oxide glass laser compositions useful as laser rods having relatively high efficiency and low solarization are provided, the compositions containing about 45 to 75 mole percent silica, about 15 to 35 percent lithia, 0 to 8 percent alumina and 0 to 30 percent calcia, with the total of lithia and calcia being not substantially more than about 50%.

CROSS REFERENCE TO RELATED APPLICATION

This application is a continuation-in-part of copending patent application Ser. No. 765,039, filed Oct. 4, 1968, now abandoned.

THE INVENTION

The present invention relates to erbium oxide/ytterbium oxide-doped glass lasers and, more particularly, to glass laser compositions of the lithia-silica system that preferably include at least some calcia and alumina, the composition exhibiting relatively high efficiency and low solarization.

Because of unique properties, lasers may be used for a great variety of purposes including scientific experimentation, a carrier for intelligence and concentration of power for welding, etc. It is highly desirable, for some of these uses, to develop a glass laser composition having relatively high efficiency at an emission wavelength of about 1.5 microns.

The problem of solarization has limited the use of glass laser compositions, many of the laser glasses exhibiting poor solarization. Although sunlight is not involved, the term "solarization" is used herein to describe the degradation such as darkening and coloration of the glass that is a result of the use of a light source for pumping energy such as a xenon flash-tube. Hence, it is highly desirable to provide an erbium oxide/ytterbium oxide-doped glass laser composition that exhibits low solarization and, at the same time, relatively high efficiency.

It is an object of the present invention to provide a glass laser composition having relatively high efficiency with an emission wavelength of about 1.5 microns.

It is an object of the present invention to provide a glass laser composition having relatively high efficiency and low solarization.

It is an object of the present invention to provide an erbium oxide/ytterbium oxide-doped glass laser composition in the lithia-silica system preferably containing calcia and alumina, the composition having relatively high efficiency, low solarization, and, in addition, having a combination of other desirable properties such as proper thermal expansion and internal mechanisms for converting minimum pump light to thermal energy.

It is an object of the present invention to provide a glass laser composition and a method of making the same, the composition having an emission wavelength of about 1.5 microns, relatively high efficiency, low solarization, and a desirable low light energy-thermal energy conversion characteristic.

It is an object of the present invention to provide a relatively high efficiency glass laser composition of the lithia-silica system containing substantial amounts of calcia, the composition comprising about 45 to 75 mole percent silica, about 15 to 35 mole percent lithia, about 0 to 30 mole percent calcia, about 0.03 to 0.30 mole percent erbium oxide, about 1.0 to 5.0 mole percent ytterbium oxide, and about 0 to ½ mole percent cerium oxide, the total amount of lithia plus calcia not being substantially higher than about 50 mole percent.

These and other objects will become apparent from the specification that follows and the appended claims.

The present invention provides an improved glass laser composition having an emission wavelength of about 1.5 microns, the glass being of the lithia-silica system and preferably containing substantial amounts of calcia and being doped with erbium oxide and ytterbium oxide. The resultant glass laser is highly resistant to solarization produced by the pump light which causes deterioration of most glass lasers.

In general, the relatively high efficiency, low solarization glass laser compositions of the present invention, having an emission wavelength of about 1.5 microns, contain the following ingredients in ranges expressed in approximate mole percent and weight percent, such weight percent corresponding very roughly to said mole percent:

| Ingredients | Mole percent | Weight percent |
|---|---|---|
| SiO$_2$ | 45 to 75 | 50 to 80. |
| Al$_2$O$_3$ | 0 to 8 | 0 to 15. |
| Li$_2$O | 15 to 35 | 8 to 20. |
| CaO | 0 to 30 | 0 to 30. |
| Er$_2$O$_3$ | 0.03 to 0.30 | 0.2 to 2. |
| Yb$_2$O$_3$ | 1.0 to 5.0 | 7 to 30. |

The present invention is directed to a relatively high efficiency, low solarization erbium oxide/ytterbium oxide-doped glass laser host material of the lithia-silica system preferably containing substantial amounts, i.e., at least ½ up to 25 or 30 mole percent, of calcia for the best results although when some properties such as chemical durability are not important, generally from 0 to about 30 percent of calcia can be used.

Generally, it has been found that lithia is the best alkali metal with respect to low solarization performance. Soda is not as good as lithia, but better than potassia which in turn is better than cesia. Usually, poor solarization results in glasses containing divalent metals and alkali metals, but the lithia-silicate glasses with optionally, some calcia, provide excellent resistance to degradation by solarization.

In the above-described lithia-silicate glasses, Er$_2$O$_3$ is used to provide the lasing ion and Yb$_2$O$_3$ is used as a sensitizing agent to absorb the pumping energy from, for instance, a xenon flashlamp, and transfer the energy to the Er$_2$O$_3$.

The preferred and optimum glass laser compositions are set forth below, each ingredient being listed in its approximate mole percent:

| Ingredients | Preferred | Optimum |
|---|---|---|
| SiO$_2$ | 48 to 65 | 49 to 62. |
| Al$_2$O$_3$ | 0 to 8 | 2 to 5. |
| Li$_2$O | 20 to 30 | 25 to 30. |
| CaO | 5 to 25 | 8 to 22. |
| Er$_2$O$_3$ | 0.03 to 0.30 | 0.05 to 0.15. |
| Yb$_2$O$_3$ | 1.0 to 5.0 | 2.0 to 4.0. |
| CeO$_2$ | 0.1 to 0.3 | 0.1 to 0.2. |

As to the amount of silica present in the compositions, when the lower limit of silica is below about 45 mole percent, the composition tends to be somewhat unstable in that it is more difficult to handle and is more likely to devitrify.

When the amount of silica is over about 75 mole percent, the melt becomes quite viscous and it is difficult to obtain good optical quality glass.

Opitionally, up to 8 mole percent of alumina can be used, it generally being preferred that, when used, at least about 2 mole percent be employed to help provide the unusual combination of properties of the laser glass including chemical durability, relatively high efficiency and low solarization. Lower amounts of alumina can be used when substantial amounts of CaO are present and still maintain desirable chemical durability.

As previously indicated, generally erbium oxide is used in amounts of about 0.03 mole percent to as high as about 0.3 mole percent or more, with the preferred range being from about 0.05 to 0.15 mole percent. Generally, it is highly preferred to have at least 0.05 mole percent $Er_2O_3$ in the composition, the optimum amount being usually from about 0.05 to 0.10 mole percent.

Generally, about 1 to 5 mole percent of $Yb_2O_3$ can be used although it is preferred that about 2 to 4 mole percent be employed for the best sensitizing action, particularly when the preferred amounts of $Er_2O_3$ are used.

It has been found that for relatively low pumping energy levels (in the neighborhood of generally about 50 to 500 joules and preferably 100 to 300 joules) for the best combination of low threshold and energy storage properties, the broad, preferred and optimum ranges in approximate mole percentages of $Er_2O_3$ and $Yb_2O_3$ are as follows:

|  | Broad | Preferred | Optimum |
| --- | --- | --- | --- |
| $Er_2O_3$ | 0.01 to 0.30 | 0.01 to 0.20 | 0.02 to 0.10 |
| $Yb_2O_3$ | 0.1 to 5.0 | 0.3 to 4.0 | 0.5 to 3.0 |

Hence, in providing both low threshold and good energy storage at the relatively low pumping energy levels, the optimum glass laser composition is approximately as follows:

Ingredients: Mole percent
$SiO_2$ ---------------------------------- 48–65
$Li_2O$ ---------------------------------- 20–30
$CaO$ ---------------------------------- 5–25
$Al_2O_3$ ---------------------------------- 1–5
$Er_2O_3$ ---------------------------------- 0.02–0.10
$Yb_2O_3$ ---------------------------------- 0.5–3.0

When used to enhance the solarization resisting property of the above-described optimum composition, $CeO_2$ is used in preferred amounts of about 0.1 to 0.5 mole percent.

Generally, the amount of the solarization-inhibiting oxide, that is preferably $CeO_2$, employed is about 1/10 to 1/2 or more mole percent. The use of at least about 1/10 mole percent $CeO_2$ helps materially to inhibit solarization which darkens the rod and results in a substantial loss in efficiency. Preferably, the amounts of $CeO_2$ are kept relatively low so that other desirable properties of the glass laser will not be affected. In some cases, other inhibiting oxides such as antimony and titania can be substituted for all or part of the $CeO_2$, but preferably at least 50 mole percent of the inhibiting oxides present is $CeO_2$. It is understood that the cerium oxide present in the glasses is reported as $CeO_2$ but that the oxide is usually present both as $CeO_2$ and $Ce_2O_3$ with the $Ce_2O_3$ probably being the major portion.

The following examples are intended to illustrate the present invention and not to limit the same.

EXAMPLE 1

A melt was prepared by mixing reagent grade raw materials to form a glass melt of high optical quality having the following composition in mole percent and, for convenience, also weight percent:

| Ingredients | Mole percent | Weight percent |
| --- | --- | --- |
| $SiO_2$ | 57.0 | 54.51 |
| $Al_2O_3$ | 2.5 | 4.06 |
| $Li_2O$ | 27.5 | 13.08 |
| $CaO$ | 10.0 | 8.93 |
| $Er_2O_3$ | 0.1 | 0.61 |
| $Yb_2O_3$ | 3.0 | 18.82 |

Rods of about ¼ inch diameter and 3 inches in length were prepared from the melt and the ends of the rods were polished to a close tolerance. The rod was placed in an elliptical cavity with a highly polished silver interior surface. An EG&G FX–38A–3 linear xenon flashlamp (EG&G Inc., Boston, Mass.) was used. The energy to the lamp was supplied from a power supply containing capacitors. In this test, the capacitance was constant at 2250 microfarads and the voltage varied from about 400 to 1000 volts. In this test, the above-described glass laser rod exhibited a lasing threshold of only 180 joules of electrical energy into the lamp.

In addition to the above-described relatively low threshold for lasing, the rods did not change color or otherwise degrade by exposure to the intense light of the xenon flashlamp pumping unit—even after many pulses.

EXAMPLE 2

A melt was prepared in a manner described in Example 1 to form a glass melt having the following approximate composition:

| Ingredients | Mole percent | Weight percent |
| --- | --- | --- |
| $SiO_2$ | 57.0 | 54.68 |
| $Al_2O_3$ | 2.5 | 4.07 |
| $Li_2O$ | 27.5 | 13.12 |
| $CaO$ | 10.0 | 8.95 |
| $Er_2O_3$ | 0.05 | 0.31 |
| $Yb_2O_3$ | 3.0 | 18.87 |

Rods were prepared from the melt and tested for threshold in a high power pulse test unit as described in Example 1. The rods showed a relatively low threshold of only 281 joules.

The rods, as the rods in Example 1, likewise did not solarize (change color) when exposed to intense light of the pumping flashlamp.

EXAMPLE 3

A melt was prepared and rods made therefrom as described in Example 1, the melt having the following approximate composition:

| Ingredients | Mole percent | Weight percent |
| --- | --- | --- |
| $SiO_2$ | 57.9 | 58.36 |
| $Al_2O_3$ | 2.5 | 4.28 |
| $Li_2O$ | 27.5 | 13.78 |
| $CaO$ | 10.0 | 9.41 |
| $Er_2O_3$ | 0.15 | 0.96 |
| $Yb_2O_3$ | 2.0 | 13.22 |

The rods were tested as described in Example 1 and exhibited a threshold of 340 joules and had little tendency to solarize.

In the above working examples, substantially equivalent results in lasing efficiency can be obtained by the use of previously described glass compositions in which cerium oxide is used as set forth, for instance, in the table indicating the preferred and optimum glass laser compositions.

EXAMPLE 4

A melt was prepared and rods made therefrom as described in Example 1, the melt having the following approximate composition:

| Ingredients | Mole percent | Weight percent |
|---|---|---|
| $SiO_2$ | 57.79 | 58.41 |
| $Al_2O_3$ | 2.5 | 4.29 |
| $Li_2O$ | 27.5 | 13.82 |
| $CaO$ | 10.0 | 9.43 |
| $Er_2O_3$ | 0.05 | 0.32 |
| $Yb_2O_3$ | 2.0 | 13.26 |
| $CeO_2$ | 0.16 | 0.46 |

The rods were tested as described in Example 1 and exhibited a threshold of 180 joules and had little tendency to solarize.

EXAMPLE 5

A melt was prepared and rods made therefrom as described in Example 1, the melt having the following approximate composition:

| Ingredients | Mole percent | Weight percent |
|---|---|---|
| $SiO_2$ | 56.79 | 54.35 |
| $Al_2O_3$ | 2.5 | 4.06 |
| $Li_2O$ | 27.5 | 13.09 |
| $CaO$ | 10.0 | 8.93 |
| $Er_2O_3$ | 0.05 | 0.31 |
| $Yb_2O_3$ | 3.0 | 18.83 |
| $CeO_2$ | 0.16 | 0.44 |

The rods were tested as described in Example 1 and exhibited a threshold of 405 joules. The rods did not solarize even when exposed to the intense light of the pumping flashlamp.

EXAMPLE 6

A melt was prepared and rods made therefrom as described in Example 1, the melt having the following approximate composition:

| Ingredients | Mole percent | Weight percent |
|---|---|---|
| $SiO_2$ | 58.29 | 60.62 |
| $Al_2O_3$ | 2.50 | 4.41 |
| $Li_2O$ | 27.50 | 14.22 |
| $CaO$ | 10.00 | 9.71 |
| $Yb_2O_3$ | 1.50 | 10.23 |
| $Er_2O_3$ | 0.05 | 0.33 |
| $CeO_2$ | 0.16 | 0.48 |

Rods were tested as described in Example 1. The rods exhibited a good combination of low threshold energy storage properties. The rods had little tendency to solarize. The efficiency for a laser rod 4 mm. x 76 mm. was determined to be over 0.1%. The rods were found to have an outstanding combination of properties including good energy transfer rates, energy transfer efficiencies, laser threshold and lasing efficiency.

The glass laser compositions of the previously described examples have an excellent balance of melting and forming properties, physical and chemical properties, solarization resistance, good emission cross-section and excellent electronic properties including absorption coefficients, decay times, energy transfer rates and energy transfer efficiencies.

It is to be understood that various modifications of the invention herein described can be made without departing from the spirit and scope thereof.

What is claimed is:

1. A glass laser composition comprising an effective lasing amount of $Er_2O_3$ and $Yb_2O_3$ and the following ingredients in approximate mole percentages:

| Ingredients: | Percent |
|---|---|
| $SiO_2$ | 45–75 |
| $Li_2O$ | 15–35 |
| $CaO$ | 0–30 |
| $Al_2O_3$ | 0–8 | the total amount of $Li_2O$ and $CaO$ being not substantially higher than about 50 mole percent, said $Yb_2O_3$ being present in an amount sufficient to sensitize $Er_2O_3$ emission.

2. A glass laser composition composing about 0.01 to 0.3 mole percent $Er_2O_3$, about 0.1 to 5.0 mole percent $Yb_2O_3$ and the following ingredients in approximate mole percentage:

| Ingredients: | Percent |
|---|---|
| $SiO_2$ | 45–75 |
| $Li_2O$ | 15–35 |
| $CaO$ | 0–30 |
| $Al_2O_3$ | 0–8 | in which the total amount of $Li_2O$ and $CaO$ is not substantially higher than about 50 mole percent.

3. A glass laser composition as defined in claim 1 in which there is about 0.01 to 0.20 mole percent $Er_2O_3$ and 0.3 to 4.0 mole percent $Yb_2O_3$.

4. A glass laser composition as defined in claim 1 in which there is about 0.02 to 0.10 mole percent $Er_2O_3$ and about 0.5 to 3.0 mole percent $Yb_2O_3$.

5. A glass laser composition having relatively high lasing efficiency and having an emission wavelength of about 1.5 microns, the composition comprising the following ingredients in the approximate mole percent indicated:

| Ingredients: | Percent |
|---|---|
| $SiO_2$ | 48–65 |
| $Li_2O$ | 20–30 |
| $CaO$ | 0.5–30 |
| $Al_2O_3$ | 0–8 |
| $Er_2O_3$ | 0.01–0.3 |
| $Yb_2O_3$ | 0.1–5 |

6. A glass composition as defined in claim 1 in which the following ingredients are present in approximate mole percent:

| Ingredients: | Percent |
|---|---|
| $SiO_2$ | 48–65 |
| $Li_2O$ | 20–30 |
| $CaO$ | 5–25 |
| $Al_2O_3$ | 1–5 |
| $Er_2O_3$ | 0.01–0.2 |
| $Yb_2O_3$ | 0.3–4 |

7. A glass composition as defined in claim 1 in which the following ingredients are present in approximate mole percent:

| Ingredients: | Percent |
|---|---|
| $SiO_2$ | 49–62 |
| $Li_2O$ | 25–30 |
| $CaO$ | 8–22 |
| $Al_2O_3$ | 2–5 |
| $Er_2O_3$ | 0.02–0.1 |
| $Yb_2O_3$ | 0.5–3 |

8. A composition as defined in claim 1 containing a small but effective solarization-inhibiting amount of $CeO_2$.

9. A glass laser composition as defined in claim 8 in which the following ingredients are present in approximate mole percent:

| Ingredients: | Percent |
|---|---|
| $SiO_2$ | 48–65 |
| $Li_2O$ | 20–30 |
| $CaO$ | 5–25 |
| $CeO_2$ | 0.1–0.3 |
| $Al_2O_3$ | 0–8 |
| $Er_2O_3$ | 0.03–0.2 |
| $Yb_2O_3$ | 1.5–5 |

10. A glass laser composition as defined in claim 3 containing a small but effective solarization-inhibiting amount of $CeO_2$.

11. A composition as defined in claim 1 in which a solarization-inhibiting oxide is present.

12. A composition as defined in claim 11 in which the solarization-inhibiting oxide is antimony oxide.

13. A composition as defined in claim 11 in which the solarization-inhibiting oxide is titanium dioxide.

14. A laser component comprising a relatively high efficient, low solarization erbium oxide/ytterbium oxide-doped glass having the following approximate composition in mole percent:

| Ingredients: | Percent |
|---|---|
| $SiO_2$ | 57.0 |
| $Al_2O_3$ | 2.5 |
| $Li_2O$ | 27.5 |
| CaO | 10.0 |
| $Er_2O_3$ | 0.1 |
| $Yb_2O_3$ | 3.0 |

15. A laser component comprising a relatively high efficient, low solarization erbium oxide/ytterbium oxide-doped glass having the following approximate composition in mole percent:

| Ingredients: | Percent |
|---|---|
| $SiO_2$ | 57.0 |
| CaO | 10.0 |
| $Al_2O_3$ | 2.5 |
| $Li_2O$ | 27.5 |
| $Er_2O_3$ | 0.05 |
| $Yb_2O_3$ | 3.0 |

16. A laser component comprising a relatively high efficient, low solarization erbium oxide/ytterbium oxide-doped glass having the following approximate composition in mole percent:

| Ingredients: | Percent |
|---|---|
| $SiO_2$ | 57.9 |
| $Al_2O_3$ | 2.5 |
| $Li_2O$ | 27.5 |
| CaO | 10.0 |
| $Er_2O_3$ | 0.15 |
| $Yb_2O_3$ | 2.0 |

17. A laser component comprising a relatively high efficient, low solarization erbium oxide/ytterbium oxide-doped glass having the following approximate composition in mole percent:

| Ingredients: | Percent |
|---|---|
| $SiO_2$ | 58.29 |
| $Al_2O_3$ | 2.50 |
| $Li_2O$ | 27.5 |
| CaO | 10.0 |
| $Yb_2O_3$ | 1.5 |
| $Er_2O_3$ | 0.05 |
| $CeO_2$ | 0.16 |

18. A laser component comprising a glass rod of the composition defined in claim 1.

19. A laser component as defined in claim 18 in which the composition contains an effective-solarization-inhibiting amount of $CeO_2$.

20. A method of making a relatively high efficiency glass laser component comprising the steps of:
(1) preparing a melt from a composition containing an effective lasing amount of $Er_2O_3$ and $Yb_2O_3$ and having the following ingredients in approximate mole percentages:

| Ingredients: | Percent |
|---|---|
| $SiO_2$ | 45–75 |
| $Li_2O$ | 15–35 |
| CaO | 0–30 |
| $Al_2O_3$ | 0–8 | the total amount of $Li_2O$ and CaO being not substantially higher than about 50 mole percent, said $Yb_2O_3$ being present in an amount sufficient to sensitize $Er_2O_3$ emission, and
(2) preparing a rod from the melt to obtain the relatively high efficiency laser glass component.

21. A method as defined in claim 20 in which the melt has about 0.01 to 0.3 mole percent $Er_2O_3$ and about 0.1 to 5 mole percent $Yb_2O_3$.

22. A method as defined in claim 20 in which the melt has the following approximate composition:

| Ingredients: | Mole percent |
|---|---|
| $SiO_2$ | 48–65 |
| $Li_2O$ | 20–30 |
| CaO | 5–25 |
| $Al_2O_3$ | 1–5 |
| $Er_2O_3$ | 0.01–0.2 |
| $Yb_2O_3$ | 0.3–4 |
| $CeO_2$ | 0.1–0.5 |

23. A method as defined in claim 20 in which the melt has the following approximate composition:

| Ingredients: | Percent |
|---|---|
| $SiO_2$ | 49–62 |
| $Li_2O$ | 25–30 |
| CaO | 8–22 |
| $Er_2O_3$ | 0.02–0.1 |
| $Yb_2O_3$ | 0.5–3.0 |
| $Al_2O_3$ | 2–5 |

24. A method as defined in claim 20 in which the melt has the following approximate composition:

| Ingredients: | Mole percent |
|---|---|
| $SiO_2$ | 57.7 |
| $Al_2O_3$ | 2.5 |
| $Li_2O$ | 27.5 |
| CaO | 10.0 |
| $Er_2O_3$ | 0.05 |
| $Yb_2O_3$ | 2.0 |
| $CeO_2$ | 0.2 |

25. A method as defined in claim 20 in which the melt has the following approximate composition:

| Ingredients: | Mole percent |
|---|---|
| $SiO_2$ | 58.29 |
| $Al_2O_3$ | 2.5 |
| $Li_2O$ | 27.5 |
| CaO | 10.0 |
| $Yb_2O_3$ | 1.5 |
| $Er_2O_3$ | 0.05 |
| $CeO_2$ | 0.16 |

26. A method as defined in claim 20 in which the melt has the following approximate composition:

| Ingredients: | Percent |
|---|---|
| $SiO_2$ | 48–65 |
| $Li_2O$ | 20–30 |
| CaO | 5–25 |
| $Er_2O_3$ | 0.03–0.2 |
| $Yb_2O_3$ | 1.5–5 |
| $CeO_2$ | 0.1–0.3 |
| $Al_2O_3$ | 0–8 |

References Cited

UNITED STATES PATENTS

| 3,457,182 | 7/1969 | Lee et al. | 252—301.4 F |
| 3,471,408 | 10/1969 | Young | 252—301.4 F |
| 3,471,409 | 10/1969 | Lee, Jr. et al. | 252—301.4 F |
| 3,533,956 | 10/1970 | Snitzer | 252—301.4 R |

ROBERT D. EDMONDS, Primary Examiner

U.S. Cl. X.R.

106—52